United States Patent [19]
Thomas et al.

[11] Patent Number: 5,788,278
[45] Date of Patent: Aug. 4, 1998

[54] ENERGY-ABSORBING STEERING COLUMN FOR MOTOR VEHICLE

[75] Inventors: Steven Mark Thomas; Xiaoyu Li, both of Saginaw; Richard Thomas Stuedemann, Hemlock, all of Mich.

[73] Assignee: General Motors Corporation, Detroit, Mich.

[21] Appl. No.: 808,204

[22] Filed: Feb. 28, 1997

Related U.S. Application Data

[63] Continuation-in-part of Ser. No. 544,237, Oct. 17, 1995, abandoned.
[51] Int. Cl.$^6$ ................................................ B62D 1/11
[52] U.S. Cl. ............................................. 280/777; 74/492
[58] Field of Search ............................. 280/777; 74/492; 188/371, 372, 374

[56] References Cited

U.S. PATENT DOCUMENTS

| | | | |
|---|---|---|---|
| 3,195,685 | 7/1965 | Blackstone | 188/1 |
| 4,630,716 | 12/1986 | Faust | 188/371 |
| 4,838,576 | 6/1989 | Hamasaki et al. | 280/777 |
| 4,901,592 | 2/1990 | Ito et al. | 74/492 |
| 4,951,522 | 8/1990 | Chowdhury et al. | 74/492 |
| 4,989,898 | 2/1991 | Yamaguchi et al. | 280/777 |
| 4,998,999 | 3/1991 | Yuzuriha et al. | 280/777 |
| 5,052,716 | 10/1991 | Matsumoto | 280/777 |
| 5,088,768 | 2/1992 | Maruyama et al. | 280/777 |
| 5,228,359 | 7/1993 | Thomas | 74/492 |
| 5,375,881 | 12/1994 | Lewis | 280/777 |
| 5,517,877 | 5/1996 | Hancock | 74/492 |
| 5,605,352 | 2/1997 | Riefe et al. | 280/777 |

FOREIGN PATENT DOCUMENTS

| | | |
|---|---|---|
| 2 391 101 | 12/1978 | France. |
| 56-2265 | 1/1981 | Japan. |
| 1 120 799 | 7/1968 | United Kingdom. |

Primary Examiner—Paul N. Dickson
Attorney, Agent, or Firm—Saul Schwartz

[57] ABSTRACT

An energy-absorbing motor vehicle steering column including a housing supported on a body structure of the vehicle for linear translation in a collapse direction and an energy absorber which converts into work a fraction of the kinetic energy of an impact on the steering column. The energy absorber includes a bare flat metal ribbon, i.e., without friction-reducing coating or lubrication, preformed to define a pair of parallel straight sections and a lateral web between the straight sections. The ribbon is seated edge-wise on a horizontal wall of the steering column housing with the straight sections in a pair of longitudinal guide channels and the lateral web looped over a pair of laterally spaced bare anvils on the housing and wedged between the bare anvils and an abutment on the body structure on the other side of the lateral web from the anvils. During linear translation of the housing in the collapse direction, the abutment anchors the center of the web on the vehicle body structure so that each of the straight sections of the flat ribbon is plastically deformed around and pulled across a corresponding one of the anvils to effect energy absorption by plastic deformation and by friction.

5 Claims, 5 Drawing Sheets

ENERGY-ABSORBING STEERING COLUMN FOR MOTOR VEHICLE

CROSS-REFERENCE TO RELATED APPLICATION

This is a continuation-in-part of U.S. Ser. No. 8,544,237, filed Oct. 17, 1995 and assigned to the assignee of this invention, now abandoned.

FIELD OF THE INVENTION

This invention relates to energy-absorbing steering columns for motor vehicles.

BACKGROUND OF THE INVENTION

Motor vehicle steering columns typically include a housing supported on body structure of the vehicle for linear translation in a collapse direction in response to an impact on the steering column and an energy absorber which converts into work a fraction of the kinetic energy of the impact. Commonly, the energy-absorbing work takes the form of plastic deformation of a material such as steel. In one prior steering column, for example, a flat steel ribbon is anchored at one end to a body structure of the motor vehicle with the plane of the ribbon horizontal. The ribbon is guided over an anvil on the steering column housing such that the plane of the ribbon is interrupted by a bump or undulation where the ribbon is guided over the anvil. During linear translation of the steering column housing characterized by relative movement between the anvil and the flat ribbon, plastic deformation of the ribbon is induced by the anvil as the bump produced by the anvil moves along the ribbon in a wave-like fashion. A steering column according to this invention is a novel alternative to the steering column having the aforesaid horizontal flat steel ribbon.

SUMMARY OF THE INVENTION

This invention is a new and improved motor vehicle steering column including a housing supported on a body structure of the vehicle for linear translation in a collapse direction in response to an impact on the steering column and an energy absorber which converts into work a fraction of the kinetic energy of the impact. The energy absorber includes a bare flat metal ribbon, i.e., without friction-reducing coating or lubrication, preformed to define a pair of parallel straight sections and a lateral web between the straight sections. The ribbon is seated edge-wise on a horizontal wall of the steering column housing, i.e., with the plane of the ribbon vertical, with the straight sections in a pair of longitudinal guide channels and the lateral web looped over a pair of laterally spaced bare anvils on the housing. An abutment on the body structure of the motor vehicle is disposed between the pair of anvils on the other side of the lateral web of the ribbon from the anvils. The lateral web is wedged between the abutment and the pair of bare anvils. During linear translation of the housing in the collapse direction, the abutment anchors the center of the web of the bare flat ribbon on the vehicle body structure so that each of the straight sections of the flat ribbon is plastically deformed around and pulled across a corresponding one of the bare anvils to effect energy absorption by plastic deformation and by friction.

DESCRIPTION OF THE PREFERRED EMBODIMENT

Figure 1:
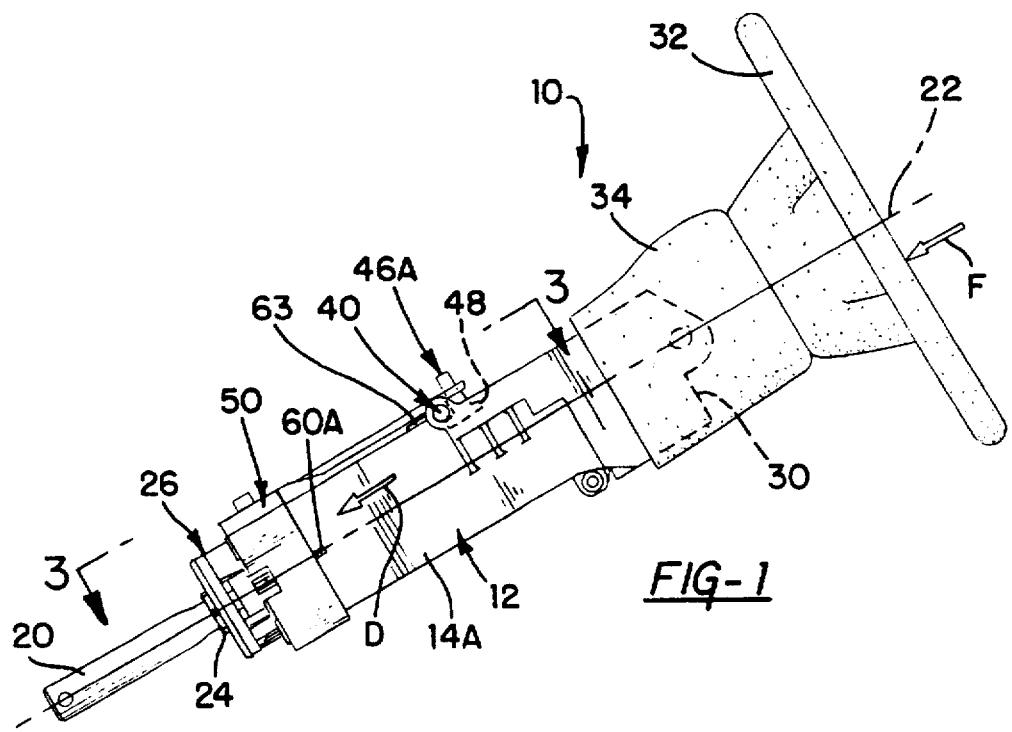
FIG. 1 is an elevational view of an energy-absorbing motor vehicle steering column according to this invention.
Figure 2:
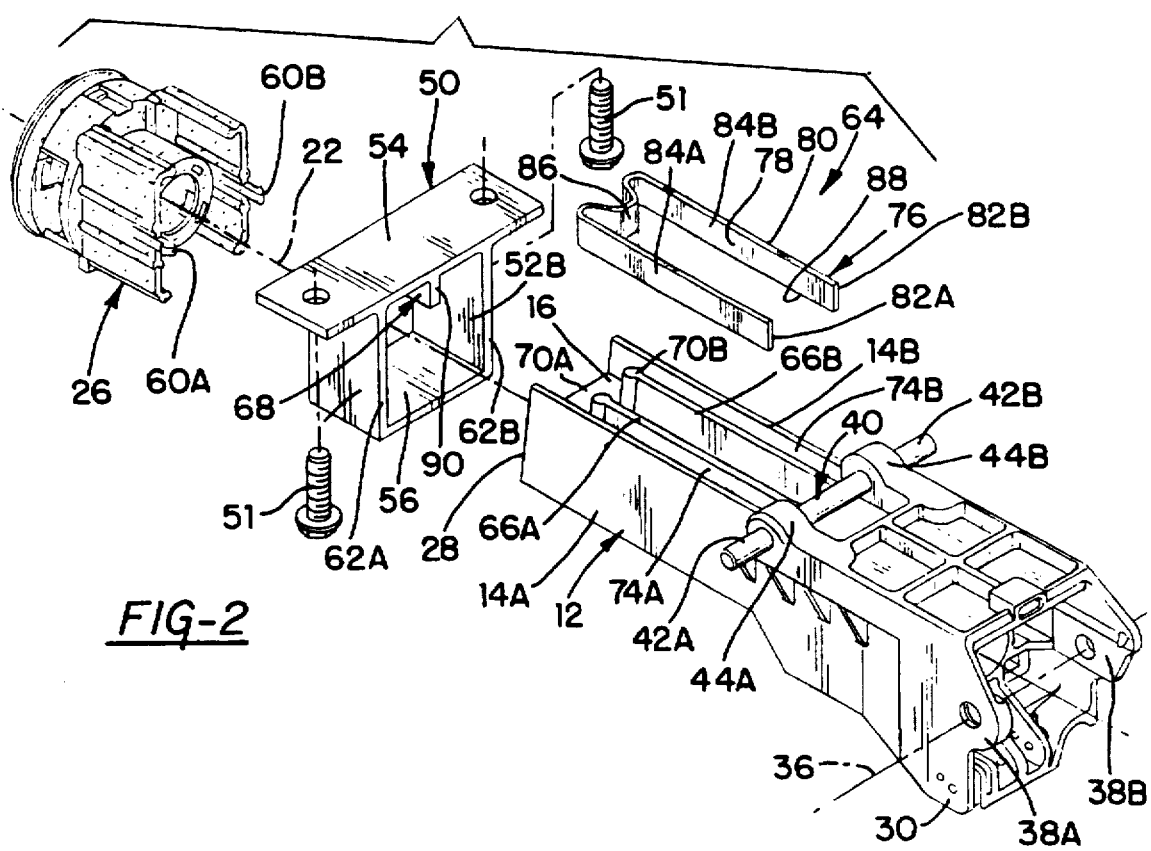
FIG. 2 is a fragmentary, exploded perspective view of the energy-absorbing motor vehicle steering column according to this invention.
Figure 3:
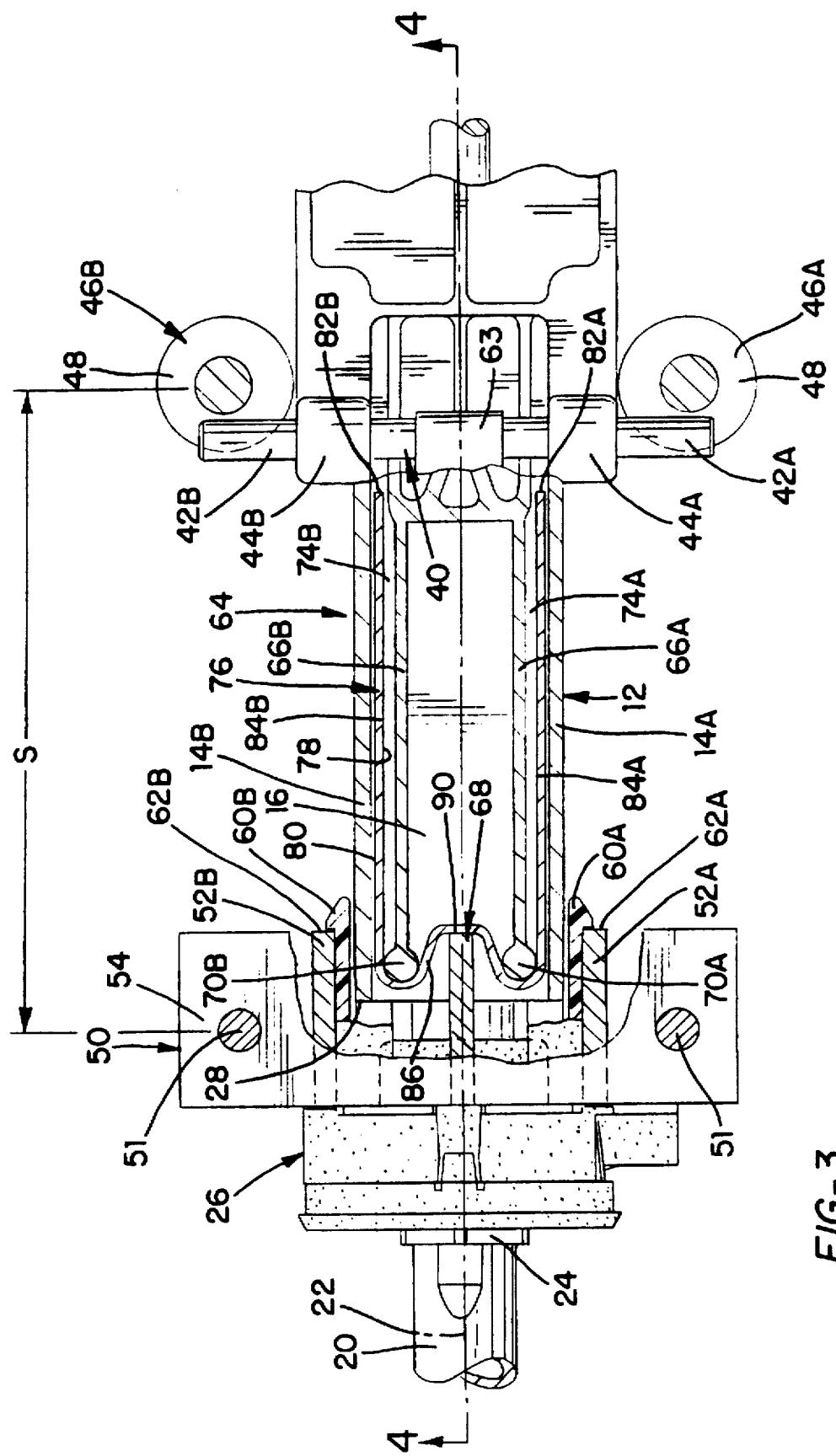
FIG. 3 is a partially broken-away view taken generally along the plane indicated by lines 3—3 in FIG. 1.
Figure 4:
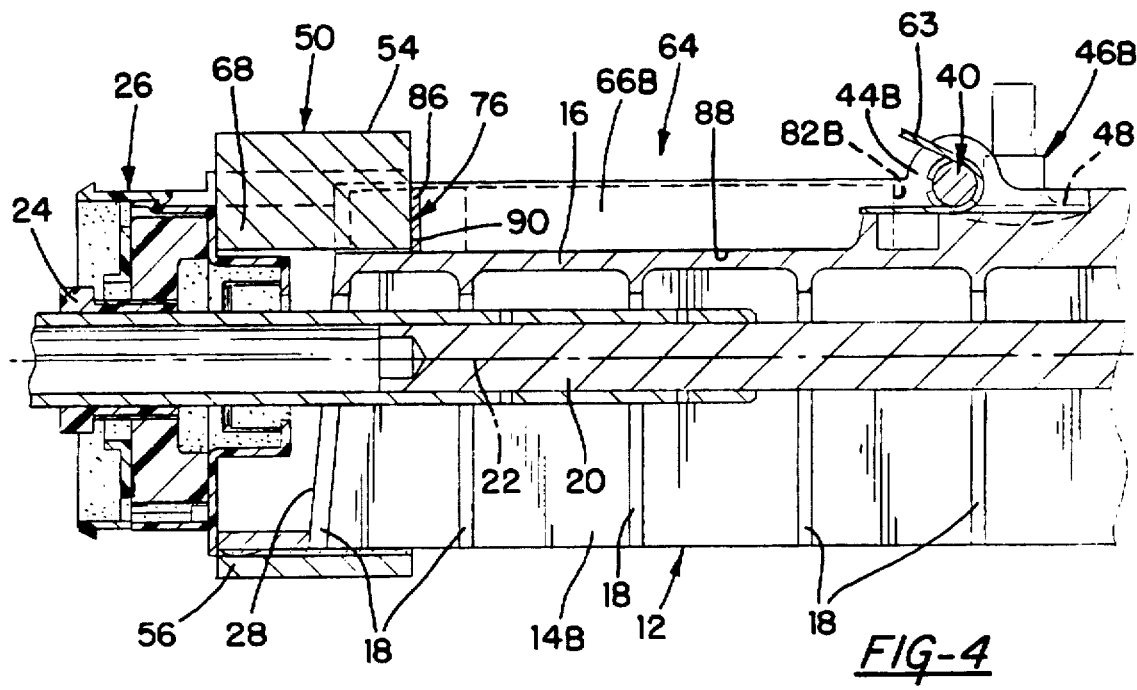
FIG. 4 is a sectional view taken generally along the plane indicated by lines 4—4 in FIG. 3.

Referring to FIGS. 1–4, an energy-absorbing motor vehicle steering column 10 according to this invention includes a die cast magnesium housing 12 having a pair of vertical walls 14A, 14B and a horizontal wall 16 reinforced from below by a plurality of integral gussets 18. A telescopically collapsible steering shaft 20 is supported on the housing 12 for rotation about a longitudinal centerline 22 of the steering column by a first bearing 24 on a plastic bearing support 26 at an inboard end 28, FIG. 2, of the housing and by a second bearing, not shown, at an enlarged and reinforced outboard end 30 of the housing.

A steering wheel 32 is connected to the steering shaft 20 and rotatably supported on a tilt housing, not shown, of the steering column concealed behind a shroud 34. The tilt housing is supported on the outboard end 30 of the housing 12 for up and down pivotal movement about a lateral centerline 36 defined by a first pair of lugs 38A, 38B on the housing 12. A horizontal rod 40 is rigidly attached to the housing 12 with a pair of lateral ends 42A, 42B thereof protruding beyond a second pair of lugs 44A, 44B on the housing.

A body structure of the motor vehicle includes a pair of laterally separated vertical hangers 46A, 46B each of which terminates at a mushroom-shaped head 48 of the hanger. A box-shaped bracket 50 is rigidly attached to the body structure of the motor vehicle by a pair of fasteners 51, FIG. 2, and, accordingly, represents part of such body structure. The bracket 50 includes a pair of vertical sides 52A, 52B outboard of the plastic bearing support 26, an upper horizontal side 54 above the housing 12, and a lower horizontal side 56 below the housing 12. A pair of hooks 60A, 60B on the plastic bearing support 26 hook behind respective ones of a pair of edges 62A, 62B of the vertical sides 52A, 52B of the bracket 50.

Figure 6:
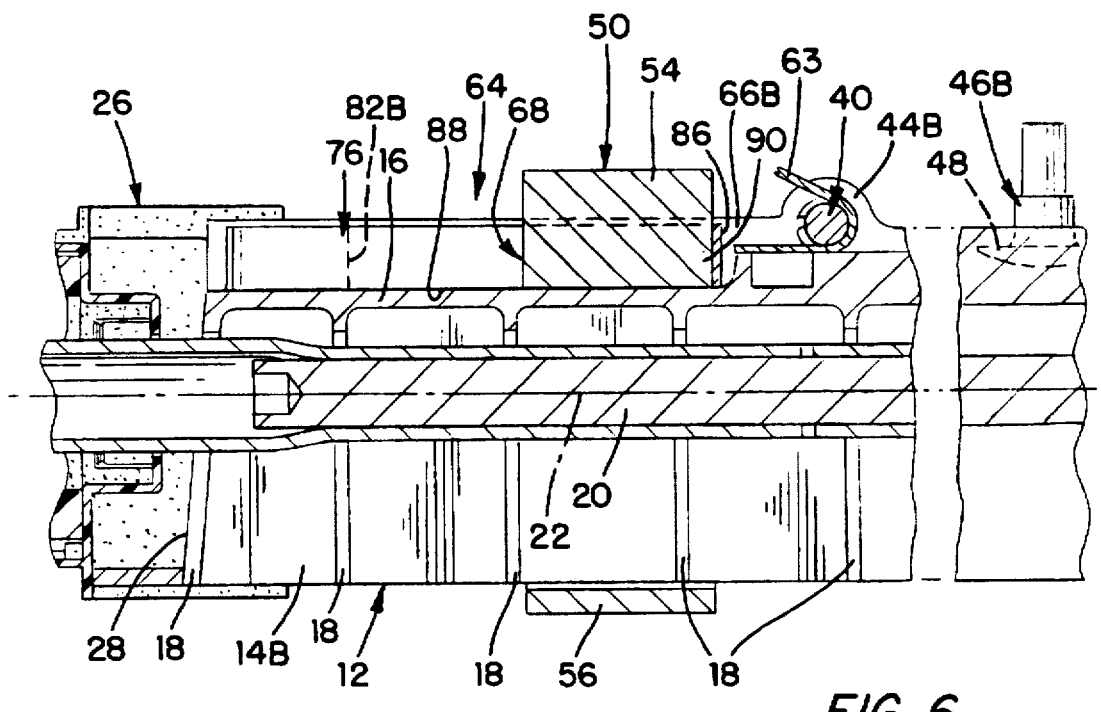
FIG. 6 is a sectional view taken generally along the plane indicated by lines 6—6 in FIG. 5.
Figure 5:
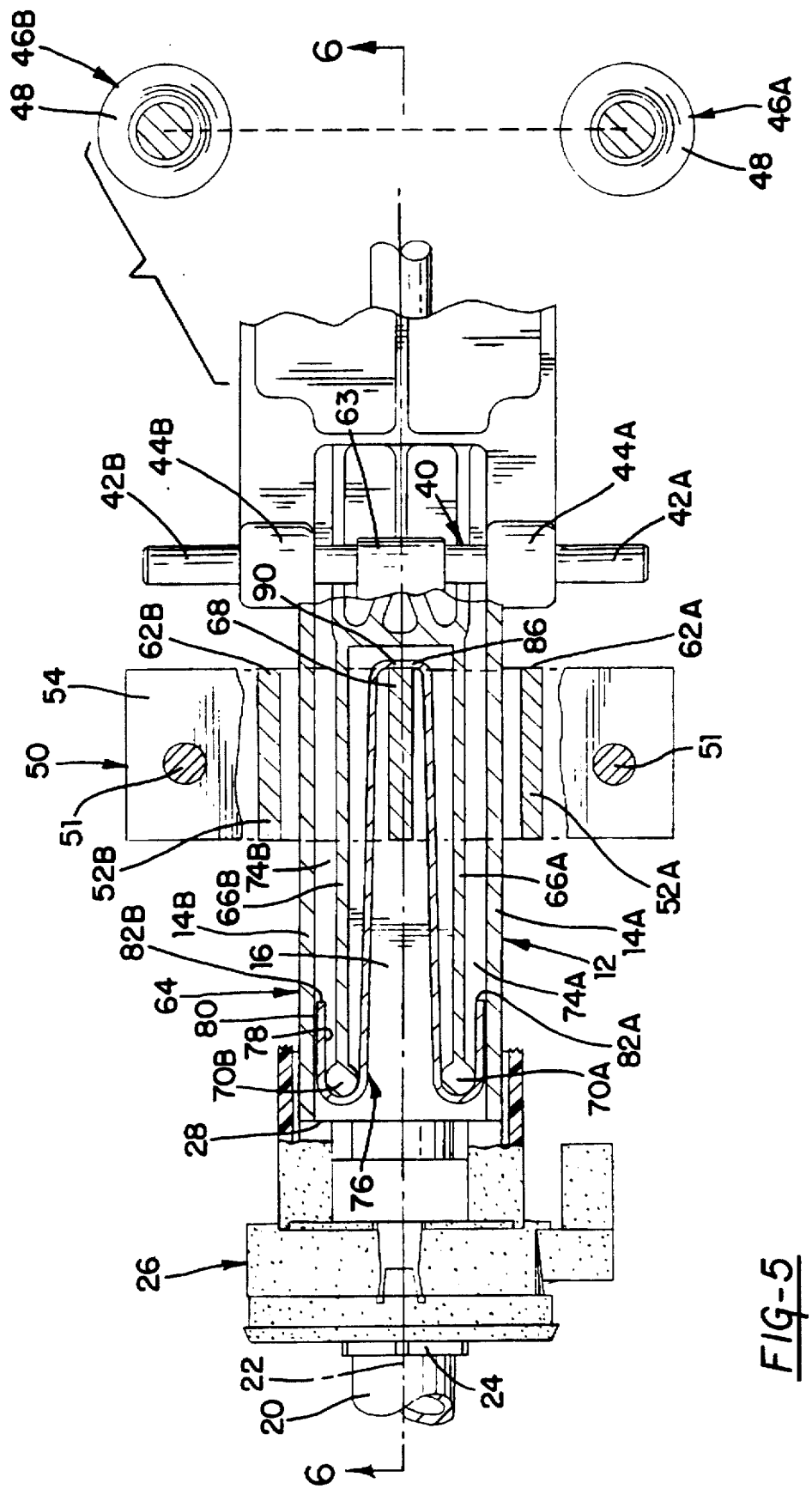
FIG. 5 is similar to FIG. 3 but showing structural elements of the energy-absorbing motor vehicle steering column according to this invention in different relative positions.

The bracket 50 vertically supports the inboard end 28 of the housing 12 on the motor vehicle body structure. The outboard end 30 of the housing is vertically supported on the body structure by the mushroom-shaped heads 48 of the hangers 46A, 46B over which are hooked the lateral ends 42A, 42B of the horizontal rod 40. A spring 63, FIGS. 4–6, around the rod 40 bears against the housing 12 and against the body structure to bias the rod 40 downward against the mushroom-shaped heads 48 of the hangers 46A, 46B.

An energy absorber 64 of the steering column 10 includes a pair of partition walls 66A, 66B integral with the magnesium housing 12 parallel to the vertical walls 14A, 14B and an abutment 68 on the bracket 50 parallel to and between the vertical walls. The partition walls 66A, 66B terminate within the confines of the bracket 50 at a pair of bare bosses 70A, 70B, i.e., without friction-reducing coatings or bushings or the like thereon, which define a pair of rigid cylindrical anvils on the housing 12 on opposite sides of the abutment 68. The partition walls 66A, 66B cooperate with the vertical walls 14A, 14B, respectively, in defining a pair of guide channels 74A, 74B on the housing each having an open end between the corresponding one of the bosses 70A, 70B and the adjacent one of the vertical walls 14A, 14B.

The energy absorber 64 further includes a flat metal ribbon 76, preferably made of low carbon steel, having an inner surface 78, an outer surface 80, and a pair of opposite ends 82A, 82B. The ribbon 76 is bare, i.e., without friction-reducing coatings on the inner and/or outer surfaces, and is preformed or prebent between its opposite ends 82A, 82B to include a pair of straight sections 84A, 84B and a lateral web 86 between the straight sections. The ribbon is seated edge-wise on the horizontal wall 16 of the housing 12, i.e., the inner and outer surfaces 78, 80 of the ribbon are perpendicular to and a side edge 88 of the ribbon is seated on the horizontal wall 16, with the straight sections 84A, 84B in the guide channels 74A, 74B. The lateral web 86 of the ribbon is looped over and extends laterally between the anvils defined by the bare bosses 70A, 70B with the bare inner surface 78 of the ribbon facing the anvils and the outer surface 80 facing a vertical edge 90 of the abutment 68.

When the box-shaped bracket 50 is rigidly attached to the body structure of the motor vehicle and the lateral ends 42A, 42B of the horizontal rod 40 are seated on the mushroom-shaped heads 48 of the hangers 46A, 46B, the hooks 60A, 60B on the plastic bearing support are easily dislodged from the edges 62A, 62B of the bracket and, therefore, afford only negligible resistance to linear translation of the housing 12 in a collapse direction "D", FIG. 1, parallel to the longitudinal centerline 22 of the steering column. A span dimension "S" of the body structure of the motor vehicle between the hangers 46A, 46B and the fasteners 51 is calculated to effectively wedge the web 86 of the metal ribbon 76 between the bosses 70A, 70B on the housing 12 and the abutment 68 on the bracket 50 when the lateral ends 42A, 42B of the horizontal rod are seated on the mushroom-shaped heads 48 of the hangers and the bracket 50 is rigidly fastened to the body structure. In that circumstance, the housing 12 can translate linearly in the collapse direction "D" only if the straight sections 84A, 84B of the flat ribbon are bent around and pulled across the anvils defined by the bosses 70A, 70B. Since forces required to effect such bending and pulling have magnitudes substantially exceeding magnitudes encountered in normal operation of the steering column, the flat ribbon 76 normally rigidly resists linear translation of the housing 12 in the collapse direction "D".

Energy-absorbing linear translation of the steering column 10 is initiated by an impact on the steering wheel in the collapse direction "D" represented by a resultant vector force "F" having a magnitude exceeding the aforesaid magnitudes encountered in normal operation of the steering column. Such impact dislodges the hooks 60A, 60B from the edges 62A, 62B of the vertical sides of the box-shaped bracket 50 and releases the housing 12 and the bearing support 26 for linear translation in the collapse direction "D" from a first position, FIGS. 1, 3 and 4, to a second position, FIGS. 5 and 6. At the onset of such linear translation, the lateral ends 42A, 42B of the horizontal rod 40 slide off of the mushroom-shaped heads 48 of the hangers 46A, 46B.

The bosses 70A, 70B on the housing 12 induce linear translation of the flat ribbon 76 as a unit with the housing in the collapse direction "D". The abutment 68, however, defines an anchor or rigid attachment of the center of the lateral web 86 of the flat ribbon to the body structure of the motor vehicle so that concurrent with advancement of the bosses 70A, 70B relative to the abutment 68, the straight sections 84A, 84B of the flat ribbon are bent substantially 180° around and are pulled across the anvils defined by the bosses 70A, 70B. The guide channels 74A, 74B maintain the straight sections 84A, 84B parallel to the longitudinal centerline 22 of the steering column. Plastic deformation of the straight sections 84A, 84B of the flat ribbon which occurs as the straight sections are bent over the anvils converts into work a fraction of the kinetic energy of the impact represented by the vector force "F". In addition, friction which develops between the bare inner surface 78 of the straight sections 84A, 84B and the bare bosses 70A, 70B converts into work an additional fraction of the kinetic energy of the impact represented by the vector force "F".

Importantly, it has been observed that the combination of a bare flat steel ribbon and bare magnesium bosses on the housing yields predictable and repeatable friction therebetween during linear translation of the housing 12 which may account for as much as 50% of the energy-absorbing capability of the energy absorber 64. By taking advantage of such predictable and repeatable friction, the flat ribbon 76 can be constructed smaller and, therefore, more economically than a ribbon in an energy absorber having comparable energy-absorbing capability but in which friction between the ribbon and the anvils is reduced or substantially eliminated by bearings, bushings or lubricants.

Figure 7:
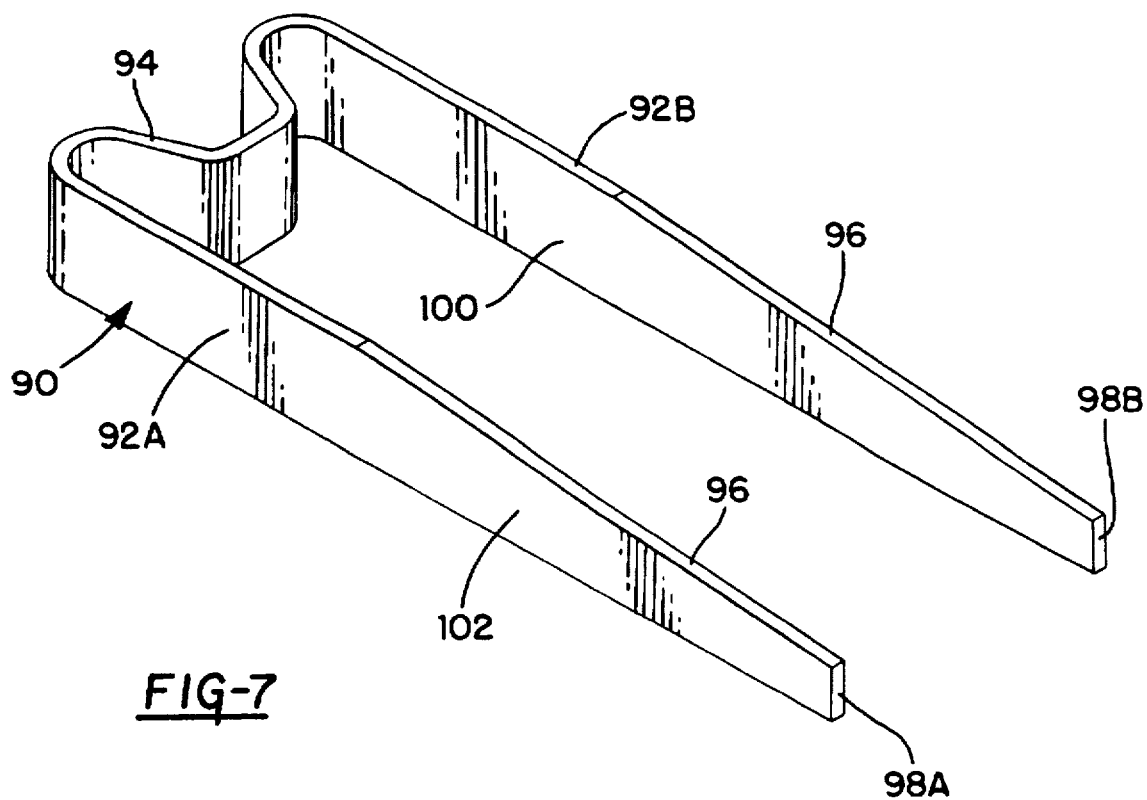
FIG. 7 is a perspective view of a modified flat metal ribbon of an energy-absorbing motor vehicle steering column according to this invention.

Referring to FIG. 7, a modified bare, flat metal ribbon 90 of the energy absorber 64 is preformed or prebent to include a pair of straight sections 92A, 92B and a lateral web 94 between the straight sections. Each of the straight sections 92A, 92B has an irregular side edge 96 which causes the cross-sectional area and the surface area of the straight sections to vary between the lateral web 94 and respective ones of a pair of opposite ends 98A, 98B of the ribbon. The ribbon is seated edge-wise on the horizontal wall 16 of the housing 12 with the straight sections 92A, 92B in the guide channels 74A, 74B. The lateral web 94 of the ribbon is looped over and extends laterally between the anvils defined by the bosses 70A, 70B with an inner surface 100 of the ribbon 90 facing the anvils and an outer surface 102 of the ribbon facing the abutment 68.

During linear translation of the housing 12 in the collapse direction "D", the work required to plastically deform the straight sections 92A, 92B around the anvils and to pull the straight sections 92A, 92B over the anvils against friction therebetween varies in accordance with the cross-sectional area and with the surface area of the straight sections. Accordingly, the modified flat ribbon 90 makes it possible to customize the energy-absorbing characteristic of the energy absorber 64 of the steering column 10.

We claim:

1. A motor vehicle energy-absorbing steering column comprising:

a housing, means operative to support said housing on a body structure of a motor vehicle for linear translation in a collapse direction from a first position to a second position in response to an impact on said steering column in said collapse direction, a flat surface on said housing, a pair of bare anvils on said flat surface of said housing spaced laterally from each other, an abutment on said body structure of said motor vehicle between said pair of anvils, a bare flat metal ribbon preformed between a pair of opposite ends thereof to include a pair of straight sections and a lateral web between said straight sections, said flat metal ribbon being seated edgewise on said flat surface of said housing with said lateral web looped over each of said pair of anvils and wedged between said pair of anvils and said abutment and with each of said straight sections parallel to said collapse direction, said abutment anchoring said lateral web to said body structure during linear translation of said housing in said collapse direction from said first position to said second position so that each of said straight sections of said bare flat metal ribbon is bent around and pulled across a corresponding one of said pair of bare anvils to convert into work by plastic deformation and by friction a fraction of the kinetic energy of said impact on said steering column, and guide means on said housing operative to maintain each of said straight sections of said flat metal ribbon parallel to said collapse direction during linear translation of said housing from said first position to said second position; and wherein said means operative to support said housing on said body structure comprises a pair of vertical hangers on said body structure on opposite sides of said housing each having an enlarged head thereon, a horizontal rod on said housing having a pair of lateral ends projecting beyond respective ones of a pair of opposite sides of said housing, each of said lateral ends being seated on said enlarged head of a corresponding one of said pair of vertical hangers whereby a first end of said housing is vertically supported on said body structure of said motor vehicle, and a box-shaped bracket rigidly connected to said body structure of said motor vehicle having said abutment rigidly attached thereto and being disposed around said housing near a second end thereof so that said second end of said housing is vertically supported on said body structure of said motor vehicle.

2. The motor vehicle energy-absorbing steering column recited in claim 1 wherein:

said bare flat metal ribbon is made of low carbon steel, and each of said bare anvils is integral with said housing and said housing is made of magnesium.

3. The energy-absorbing motor vehicle steering column recited in claim 2 wherein said guide means on said housing operative to maintain each of said straight sections of said flat metal ribbon parallel to said collapse direction comprises:

a first guide channel on said housing parallel to said collapse direction slidably receiving a first one of said pair of straight sections of said bare flat metal ribbon and defined between a first wall of said housing and a first partition on said housing perpendicular to said flat surface and parallel to said first wall, and a second guide channel on said housing parallel to said collapse direction slidably receiving a second one of said pair of straight sections of said bare flat metal ribbon and defined between a second wall of said housing and a second partition on said housing perpendicular to said flat surface and parallel to said first wall.

4. The energy-absorbing motor vehicle steering column recited in claim 3 wherein said pair of anvils on said flat surface of said housing spaced laterally from each other comprises:

a first cylindrical boss integral with and disposed on an end of said first partition on said housing perpendicular to said flat surface on said housing, and a second cylindrical boss integral with and disposed on an end of said second partition on said housing perpendicular to said flat surface on said housing.

5. The energy absorbing motor vehicle steering column recited in claim 4 wherein:

at least one of the cross-sectional area and the surface area of each of said straight sections of said bare flat metal ribbon varies between said lateral web of said bare flat metal ribbon and a corresponding one of a pair of opposite ends of said bare flat metal ribbon.

* * * * *